United States Patent
Kurtz et al.

(10) Patent No.: US 7,275,452 B2
(45) Date of Patent: Oct. 2, 2007

(54) STOP ASSEMBLY FOR A BEAM TYPE LOAD CELL

(75) Inventors: Anthony D. Kurtz, Ridgewood, NJ (US); Adam Kane, Morristown, NJ (US); Richard Martin, Ridgewood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 297 days.

(21) Appl. No.: 10/396,174

(22) Filed: Mar. 25, 2003

(65) Prior Publication Data

US 2004/0187608 A1    Sep. 30, 2004

(51) Int. Cl.
G01L 1/26 (2006.01)
G01L 5/04 (2006.01)

(52) U.S. Cl. .............................. 73/862.391; 73/862.638
(58) Field of Classification Search ................. 73/716, 73/862.382, 862.622, 862.66, 862.391, 727, 73/862.61, 796, 862.638; 177/211, 136, 177/229; 338/42
See application file for complete search history.

(56) References Cited

U.S. PATENT DOCUMENTS

| | | | | |
|---|---|---|---|---|
| 3,824,846 A | * | 7/1974 | Andersson | 73/781 |
| 4,009,607 A | * | 3/1977 | Ficken | 73/862.61 |
| 4,051,451 A | * | 9/1977 | Kurtz et al. | 338/42 |
| 4,199,980 A | * | 4/1980 | Bowman | 73/862.382 |
| 4,338,825 A | * | 7/1982 | Amlani et al. | 73/862.382 |
| 4,364,279 A | * | 12/1982 | Stern et al. | 73/862.622 |
| 4,561,512 A | * | 12/1985 | Tramposch | 177/229 |
| 4,598,781 A | * | 7/1986 | Tramposch | 177/211 |
| 4,744,429 A | * | 5/1988 | Kellenbach | 177/211 |
| 5,068,635 A | * | 11/1991 | Yajima | 338/42 |
| 5,313,023 A | * | 5/1994 | Johnson | 177/229 |
| 5,335,544 A | * | 8/1994 | Wagner et al. | 73/514.32 |
| 5,440,077 A | * | 8/1995 | Konishi et al. | 177/185 |
| 5,796,007 A | * | 8/1998 | Panagotopulos et al. | 73/716 |
| 5,955,771 A | * | 9/1999 | Kurtz et al. | 257/419 |
| 6,736,008 B2 | * | 5/2004 | Kumagai et al. | 73/504.14 |

* cited by examiner

Primary Examiner—Michael Cygan
Assistant Examiner—Octavia Davis
(74) Attorney, Agent, or Firm—Plevy, Howard & Darcy

(57) ABSTRACT

A beam load cell transducer is positioned between a stationary member and moveable member. The stationary member, as well as the moveable member are surrounded by a collar, which collar has an inner surface means to limit the movement of the moveable member of the transducer. By limiting the movement and restraining further movement after a predetermined excessive force is applied, one stops the beam and therefore prevents the beam from fracturing or rupturing. In the unlikely event that the beam does fracture or rupture, then the sleeve acts to hold the entire unit together, thereby maintaining integrity to the transducer.

19 Claims, 6 Drawing Sheets

STOP ASSEMBLY FOR A BEAM TYPE LOAD CELL

FIELD OF THE INVENTION

This invention is related to the field of stress measurement devices and more specifically to a safety assembly in case of load cell failure.

BACKGROUND OF THE INVENTION

Beam load cell stress measurement devices are well-known in the art. FIG. 1 illustrates a simplified model of a conventional beam load cell 100. In this model, load cell 100 consists of a fixed first part 110, a moveable second part 120 and measurement component, referred to as load-beam, 130 therebetween. Measurement component 130 further includes measurement resistors 140 thereon. The resistors may be piezoresistors or other devices. The resistors 140 change resistance value in accordance with the magnitude of an applied force or stress.

As force 145 is applied to load cell 100, the second part 120 moves in accordance with the applied force, and measurement component 130 is stressed in response. Beam type transducers are known in the prior art and it is known how to limit the deflection. See U.S. Pat. No. 4,051,451 entitled, "Beam Type Transducers Employing Dual Direction Limiting and Means", which issued on Sep. 27, 1977 to A. D. Kurtz et al and is assigned to Kulite Semiconductor Products, Inc., the assignee herein. That patent shows a beam subjected to a transverse force (up and down) to move the beam with a stop above and below the beam.

See also U.S. patent application Ser. No. 09/814,903 entitled, "Force Transducer with Environmental Protection" filed Mar. 22, 2001 for A. D. Kurtz et al. and assigned to the assignee herein. This application shows a beam load cell as utilized herein.

In the load cell transducer, as shown in FIG. 1, as one can ascertain, if unusually large forces are applied in either a pull or a push direction, the beam can fracture and actually come apart. In this manner, it can cause catastrophic failure of the entire system. For example, one may want to measure the stresses applied on an aircraft rudder during a mission or during normal operation. One may use the pressure sensor as part of a servo system, where as the pressure increases, one may want to turn the rudder or apply more or less force on the rudder. If the beam fractures, then the entire sensor becomes inoperable and therefore, there would be no recovery of the control system. However, if the beam is stopped and prevented from rupturing or fracturing, then when normal forces are applied, the sensor will still operate during normal operation and thus, a disaster can be circumvented. In this manner, there is provided a new and improved load cell which employs a stop to prevent the rupture or breakage of a beam employed for measuring forces in either a push or a pull direction.

SUMMARY OF THE INVENTION

A beam load cell of the type having a stationary member and a moveable member with a beam positioned therebetween, such that when a force is applied to the moveable member, the beam is moved in the direction of the force and for an undesirably large force the beam can rupture. In combination with the load cell there is a stop member to limit the movement of the moveable member in either a push or pull direction and therefore, to limit the movement of the beam. The stop comprises a longitudinal tubular member which surrounds the stationary and moveable members and the beam, and stop means are located on the inner surface of the tubular member to coact with the moveable member for limiting the distance, the movable member travels upon application thereto of an applied push or pull force, the stop means therefore limits the force applied to the beam to prevent it from breaking or rupturing.

BRIEF DESCRIPTION OF THE DRAWINGS

FIG. 2b illustrates a cross-sectional view, through section A-A of the fault-tolerant load cell shown in FIG. 2a;

FIGS. 3a and 3b illustrate enlargements of the engagement means of the fault-tolerance load cell shown in FIG. 2a;

FIG. 5b illustrates a cross-sectional view, through section A-A of the fault-tolerant load cell shown in FIG. 6a.

Figure 1:
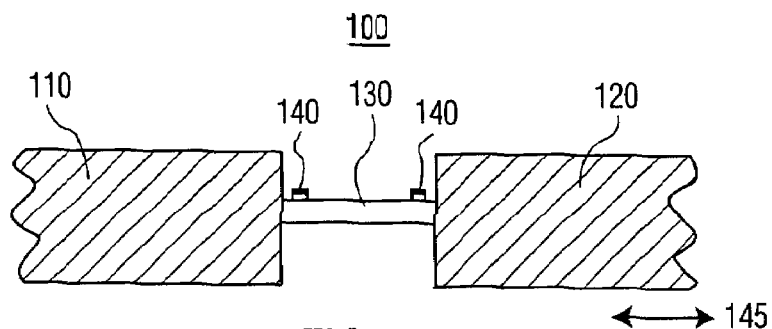
FIG. 1 illustrates a cross-sectional view through a longitudinal axis of a conventional prior art load cell.

It is to be understood that these drawings are solely for purposes of illustrating the concepts of the invention and are not intended as a definition of the limits of the invention. The embodiments shown in FIGS. 1 through 6 and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION OF THE INVENTION

Figure 2A:
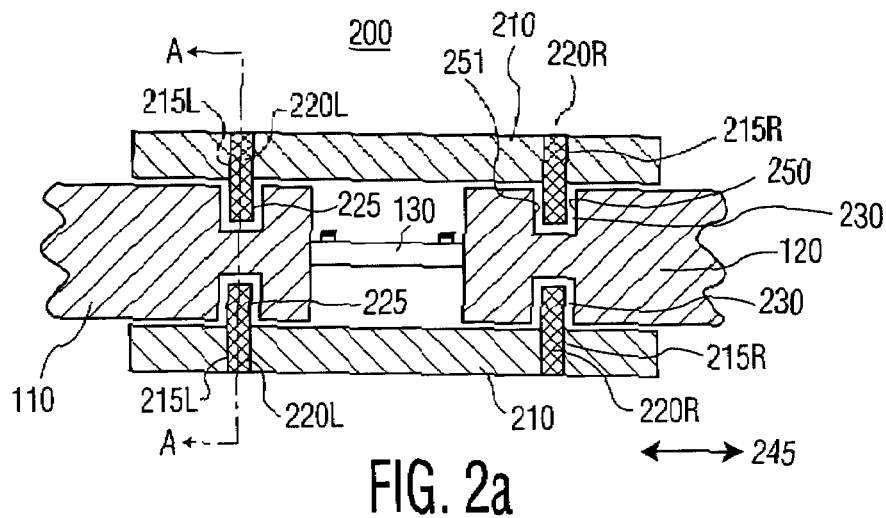
FIG. 2a illustrates a cross-sectional view, through a longitudinal axis of a fault-tolerant load cell in accordance with the principles of the invention.

FIG. 2a illustrates a cross-sectional view, through a longitudinal axis, of a fault-tolerant load cell 200 in accordance with the principles of the invention. The same reference numerals designate similar parts as depicted in FIG. 1. In this case, a fixed first part or stationary member 110 includes recesses 225 that are used to engage and fixedly retain engagement means 220L. Movable second part 120 similarly includes recesses 230 that are used to engage and slidably retain engagement means 220R. A cylindrical collar or longitudinal tubular member 210 surrounds the first part 110 and the second part 120 and further includes openings 215R and 215L that operates to allow engagement means or pins 220 L and R to pass through collar 210 to be positioned in recesses 225 and 230 respectively. As one can see, the pins 220 are designated as 220L (220 Left) for pins associated with member 110 and as 220R (220 Right) for pins associated with member 120. This designation is also used for apertures or channels 215L and 21 SR. As can be seen, recess or aperture 225 is of a smaller width than aperture or recess 230. Thus, movable member 120 can slide or move within the recess 230 a predetermined distance. The movement of the pin 220R within the recesses 230 is practically frictionless. If a large force is applied to member 120 in the direction (right) of arrow 245 (FIG. 2a) the pin 220R will abut against the wall 250 (FIG. 2a) acting as a stop and preventing further movement of member 120. If a large force is applied in the opposite direction of arrow 245 (left), the pins abuts against the wall 251, acting as a stop in that direction.

Figure 2B:
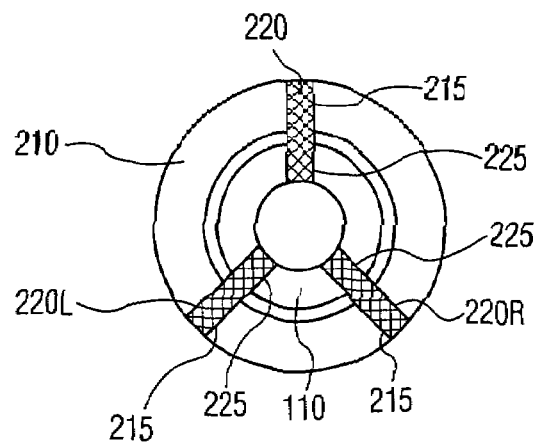

FIG. 2b illustrates a cross-sectional view, through section A-A, of fault-tolerant load cell 200 in accordance with the principles of the invention. In this view, the insertion of engagement means 220 through channel 215 in collar 210 to engage recesses 225 in first part 110 are more clearly shown. In this case, three engagement means 220 are shown in a conventional orientation of 120 degrees to distribute any load that may be exerted thereon. Although only three pins 220 are illustrated, it would be appreciated that any number of pins may be used. The multiple pins also act as an alignment means to prevent the transducer from responding to off axis loads. The number of pins needed may be determined based on the material properties and thickness of the pin and the holding power necessary to retain the load cell after a failure of component 130. For example, pin 220 may be selected from materials such as a rigid plastic, nylon, carbon steel, stainless steel, based on the operating conditions and the expected loads that may cause failure. Thus, in light load conditions, plastic or nylon may be suitable materials, whereas in heavier loads or more critical situations, metal or carbon steel composites may be suitable. In conditions having high humidity, stainless steel may be an appropriate material.

Engagement means 220 is further illustrated as a pin that is press fit or snap fit into channels 215 L&R. However, it should be appreciated that channel, 215 L&R, recess 225 and 230 may be threaded. In this case, engagement means 220 L&R may be a screw, e.g., a set screw, that is screwed into channel 215 and recess 225 or other threaded device as a bolt.

Figure 3A:
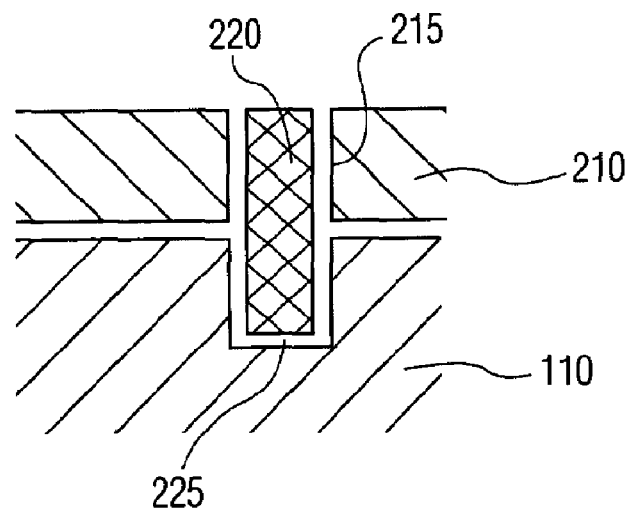

FIG. 3a illustrates an enlarged view of engagement of pin 220 through passage 215 in collar 210 to engage recess 225 in first part 110. In this illustrated case, a tight fit between pin 220 and recess 225 is desired. Accordingly, recess 225 is preferably in the order of 1-2 mils greater than pin 220. In this case, pin 220 may be snap-fit or press-fit into passage or channel 215 and recess 225. As noted above, channel 215 and/or recess 225 may be threaded which would allow for the use of a screw or set-screw.

Figure 3B:
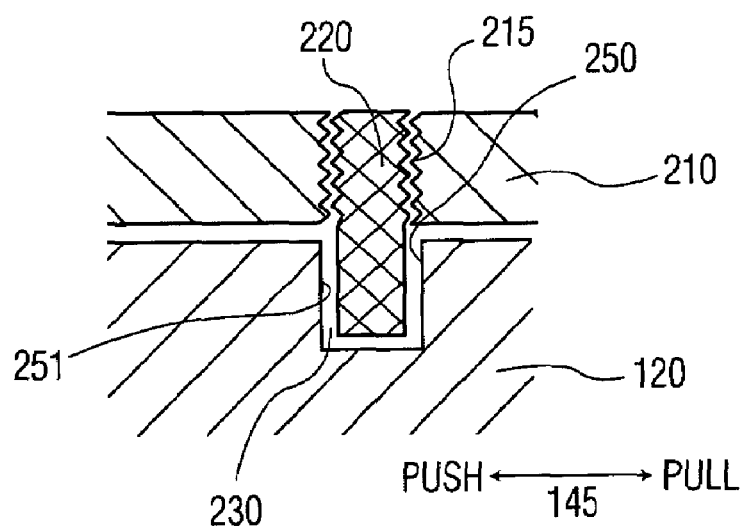

FIG. 3b illustrates an enlarged view of engagement of a threaded pin 220 through a threaded passage 215 in collar 210 to enter recess 230 in second part 120. In this case, recess 230 is larger than pin 220 to allow a slip fit between pin 220 and recess 230 as second part 120 is required to move freely in response to the application of force 145. The force 145 is a pulling force as compared to a force in the opposite direction which is a pushing force (double arrow). A large pulling force 145 can cause the beam to rupture or fracture. Similarly, a large pushing force can bend the beam as in a U-shape and break the beam as well. Once the beam is broken, as seen in FIG. 1, there is no coupling between members 110 and 120. However, the collar keeps the unit together as the pins prevent dislodging of members 110 and 120 and therefore, the sensor will still be in circuit and prevent catastrophic failure. Hence, the width of recess 230 is preferably in the order of 10 mils greater than the width of pin 220. This is sufficient to enable second part 120 to move unhindered and cause stress in component 130. For example, assuming at full load second part 120 is designed to move up to 14 mils, then a clearance of 20 mils is needed around pin 220 to allow collar 210 not to limit movement and degrade the measurement.

When a larger force 145 is applied, the pin 220 abuts against the wall 250 for a large pull force 145. For a push force, the pin abuts against wall 251. Thus, the walls 250 and 251 of the channel 230 engage the pin 220 for a push or pull and stop the movement of the beam in either direction.

Figure 4:
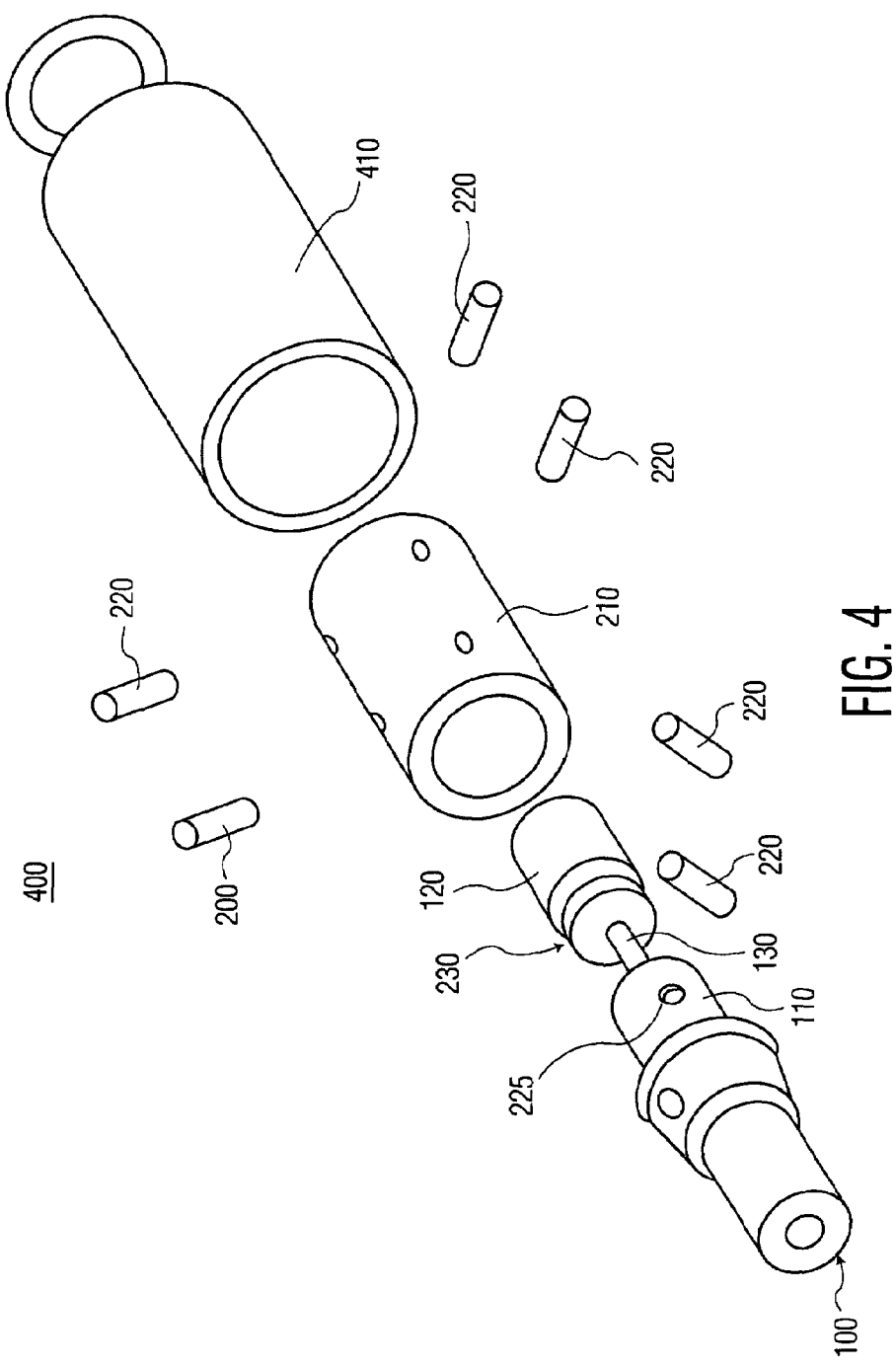
FIG. 4 illustrates a prospective view of a fault-tolerant load cell in accordance with the principles of the invention.

FIG. 4 illustrates a perspective view of a preferred embodiment of the present invention. In this view, collar or strength bypass element 210 is attached to load cell 100 using two sets of three pins 220. Pins 220 are set in a series of recesses, shown as holes, 225 on first part 110 and in a recess, shown as groove 230 or part 120. If the beam 130 breaks apart, the collar 210 will hold the load cell 100 together, through the engagement of pins 220 in holes 225 and groove 230. Environmental cover 410 is advantageous as it protects load cell and collar 210 from dirt, humidity, etc., but is not necessary for the operation of the invention. One could also use a bellows to surround the beam, as is known.

As further noted, if the load beam 130 fails, second part 120 is no longer restrained by load beam 130 and is not coupled to first part 110 and moves or shifts in a manner greater than desired in the prior art. In this case, the movement or shift of second part 120 causes the substantially vertical walls of recess 230 to engage pin 220. Hence, the integrity of load cell 100 is maintained. For example, when load beam 130 is a single beam measuring 0.270× 0.120×0.4 inches of 15-5 steel it can be determined that a load or force of 4455 lbs. can be applied before a failure of the load beam 130 occurs. However, safety collar or assembly 110 incorporating three pins 220 of 3/16 diameter, each having a shear strength of 3600 lbs., may retain the integrity of cell 110 up to a force of 10,800 lbs. However, the main purpose is to stop the movement of the beam when excessive forces are applied and therefore prevent the rupture of the beam.

Although the use of holes on first part 110 and a groove on second part 120 is shown, it would be appreciated that recess 225 may also be a groove that allows a tight-fit between pin 220 and recess 225 along the longitudinal axis. Similarly, recess 230 may be an elongated hole or slot that allows for a slip fit between pin 220 and recess 230 in the longitudinal axis.

Figure 5A:
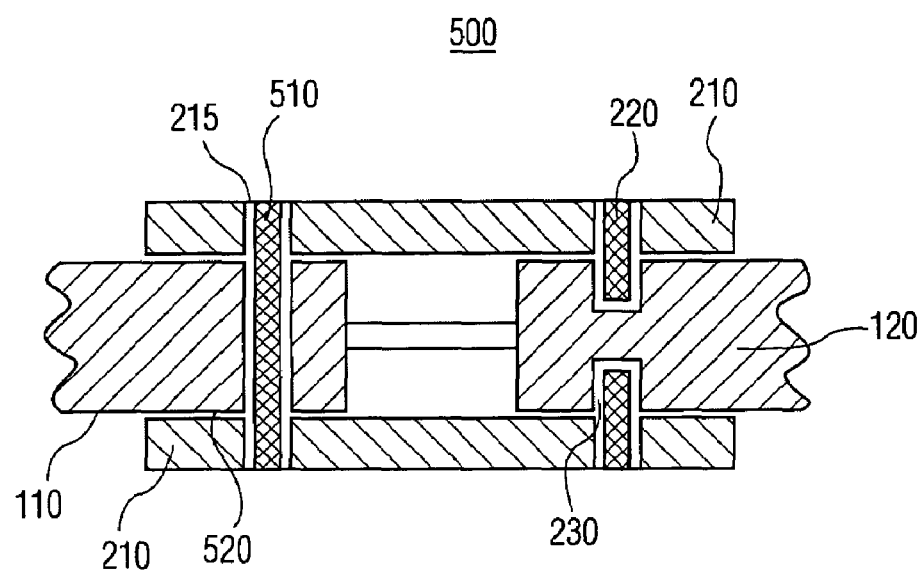
FIG. 5a illustrates a cross-sectional view, through a longitudinal axis of another embodiment of a fault-tolerant load cell in accordance with the principles of the invention.

FIG. 5a illustrates a cross-sectional view, through a longitudinal axis, of a second embodiment 500 of the present invention. In this embodiment, channel 520 passes though first part 110 and engagement means 510 passes through oppositely opposed channels 215 in collar 210 and through channel 520.

Figure 5B:
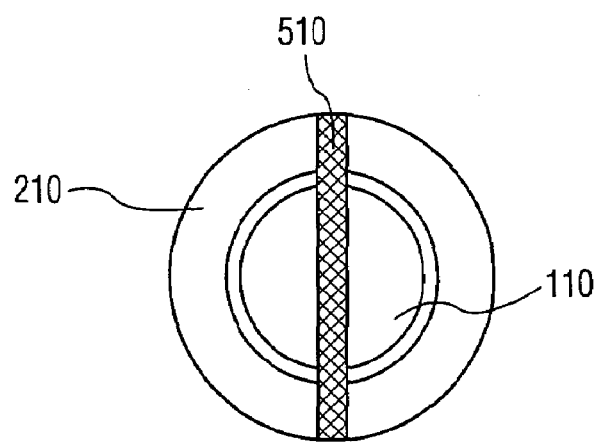

FIG. 5b illustrates a cross-sectional view, through section A-A, of the embodiment of the invention shown in FIG. 5a. This view more clearly illustrates the passage of pin 510 through first part 110. Although not shown, it would be appreciated that one or more channels and/or passage 510 may be threaded. In this case pin 520 may include a compatible screw thread.

Figure 6A:
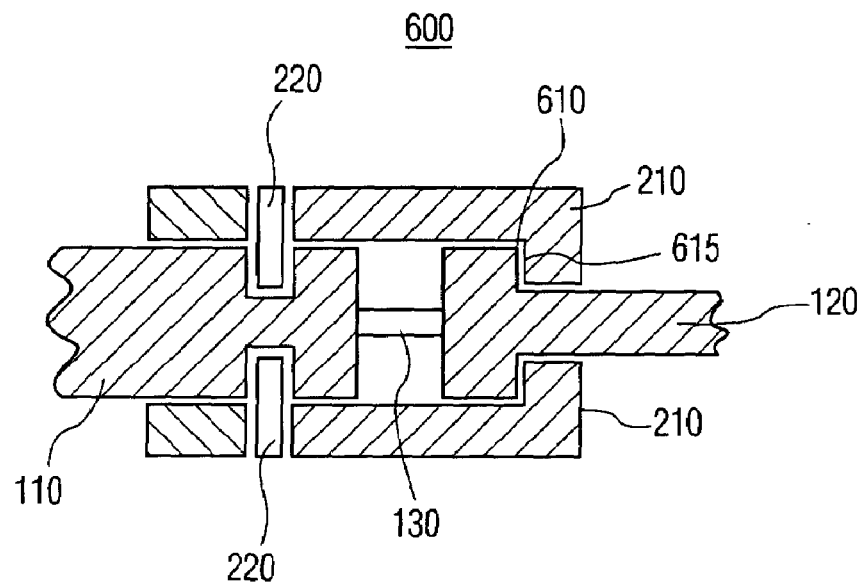
FIGS. 6a, 6b, 6c and 6d illustrate cross-sectional views of exemplary fault-tolerance load cells in accordance with the principles of the invention.
Figure 6B:
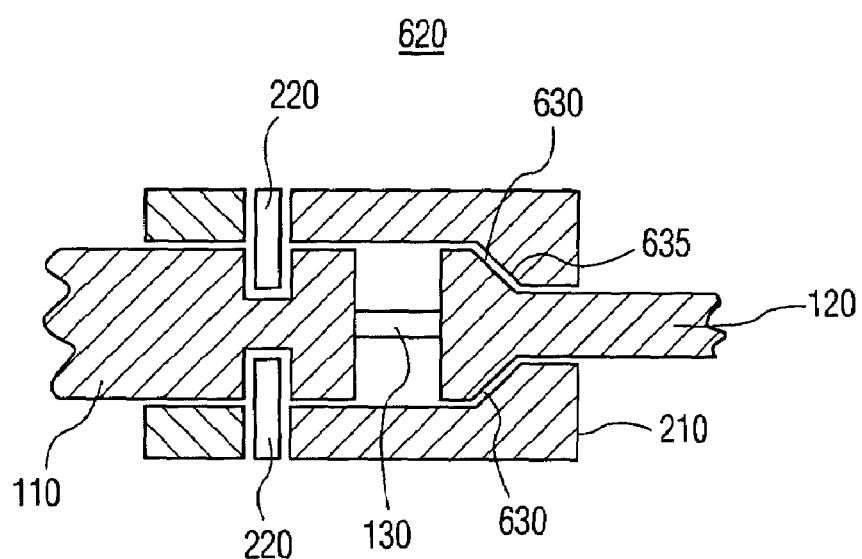
Figure 6C:
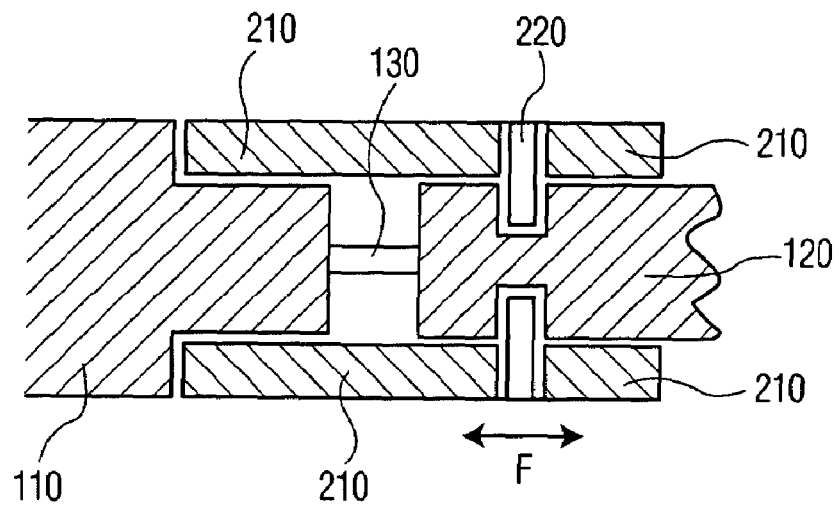
Figure 6D:
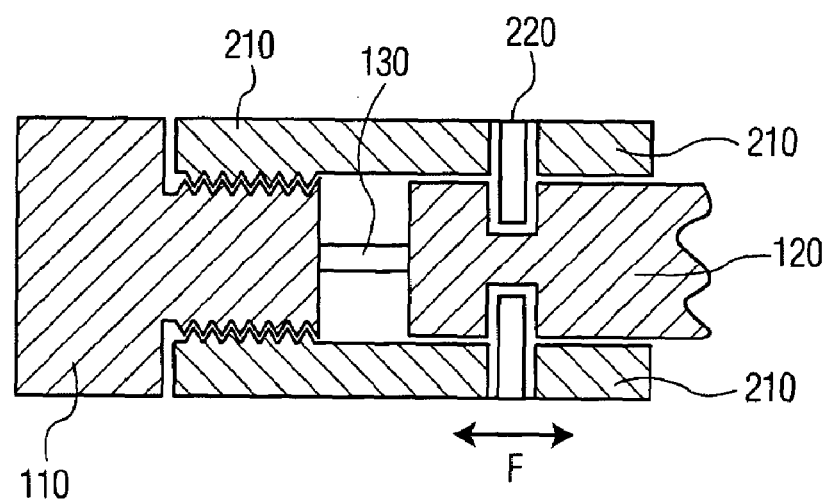

FIGS. 6a-6d illustrate further exemplary embodiments of the present invention. For example, FIG. 6a illustrates one aspect 600 wherein the second part 120 includes a lip 610 that engages lip 615 on collar 210. In this case, when the beam component 130 fails, lip 610 and 615 engage to prevent second part 120 from separating from first part 110. FIG. 6b illustrates another embodiment 620 of the present invention. In this exemplary embodiment lip 630 on second part 120 and lip 635 are angled to create a tapered fit when engaged. FIG. 6c illustrates another embodiment of the present invention, wherein first part 110 is welded, brazened or adhesively engaged to collar 210. FIG. 6d illustrates another exemplary embodiment of the present invention, wherein first part 110 and collar 210 are threadedly engaged. First part 110 and 210 may be further welded, brazened or adhesively engaged or attached.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A beam load cell of the type having a first stationary member and a second moveable member with a beam positioned therebetween, such that when a force is applied to said moveable member in either a push or pull direction, said beam is moved in the direction of the force and exerts force on said first stationary member, said beam having located on the surface thereof at least one force responsive sensor and for an undesirably large force said beam can rupture, in combination therewith a stop member to limit the movement of said moveable member for a large force applied to the cell in either a push or pull direction and therefore, to prevent breakage of said beam, comprising:
    a longitudinal tubular member surrounding at least said second member,
    and means located on the inner surface of said tubular member to coact with said second member for limiting the distance said second member travels upon application thereto of a push or pull force.

2. The beam load cell according to claim 1 wherein said tubular member surrounds said first and second members and said beam, wherein said means located on said tubular member includes at least one pin extending from said inner surface towards said second member,
    said second member having a channel to accommodate said pin, said channel having a width to enable said second member to move a predetermined distance for either a pull or push force of an excessive magnitude applied thereto and according to the width of said channel, whereby said pin abuts the corresponding wall of said channel to act as a stop to prevent breakage of said beam.

3. The beam load cell according to claim 2 wherein said pin is fabricated from one of the following materials: metal, rigid plastic, nylon or carbon steel.

4. The beam load cell according to claim 2 wherein said pin is secured within an aperture on said tubular member.

5. The beam load cell according to claim 1, wherein said means located on said tubular member include a depending flange directed towards said second member, said second member having a corresponding flange separated from said depending flange by a given distance defining a predetermined movement of said second member upon application of a push or pull force thereto.

6. The beam load cell according to claim 5 wherein the flange on said second member is tapered and said flange on said tubular member has a corresponding taper.

7. The beam load cell according to claim 2 further including a plurality of pins extending from said tubular second member, each one associated with a respective channel located on said second member.

8. The beam transducer according to claim 2, further including at least a first aperture located on said tubular member for accommodating a pin, and a second aperture located on said first stationary member aligned with said first aperture, a pin directed through said first and second aperture for rigidly securing said stationary member to said tubular member to prevent movement of said stationary member with respect to said tubular member.

9. The beam transducer according to claim 1 wherein said force responsive sensor is a piezoresistor.

10. A beam load cell of the type having a first stationary member and a second moveable member with a beam positioned therebetween, such that when a force is applied to said second member said beam moves in the direction of the force, in combination a stop member to limit the movement of said second member and therefore said beam, comprising:
    a sleeve surrounding said first and second members and said beam, said sleeve having apertures associated with and aligned with said first and second members,
    at least one channel located on said second member and dimensioned according to a desired maximum movement of said second member, said channel aligned with at least one aperture aligned with said second member,
    a pin directed through said aperture to enter such channel to enable said second member to move upon application of a push or pull force a distance determined by the width of said channel and indicative of a maximum movement of said second member to cause said pin to impinge on a wall of said channel, thus restraining further movement of said second member and said beam.

11. The beam load cell according to claim 10 wherein said force is a push or pull force.

12. The beam load cell according to claim 10 wherein said pin is secured within an aperture located on a surface of said sleeve and extending into said channel.

13. The beam load cell according to claim 10 wherein said stationary member is rigidly secured to said sleeve.

14. The beam load cell according to claim 10 wherein said pin is fabricated from a metal.

15. The beam load cell according to claim 10 wherein said metal is stainless steel.

16. The beam load cell according to claim 10 wherein said beam has at least one force sensor positioned on a surface thereof.

17. The beam load cell according to claim 10 further including an outer cylindrical housing surrounding said sleeve for protecting said sleeve and said beam from the environment.

18. The beam load cell according to claim 16 wherein said force sensor is a piezoresistor.

19. The beam load cell according to claim 12 wherein said pin and aperture are threaded to enable said pin to be rigidly secured to said sleeve.

* * * * *